United States Patent [19]
Higuchi

[11] 3,738,239
[45] June 12, 1973

[54] ELECTRONIC FLASH DEVICE FOR PHOTOGRAPHY

[75] Inventor: Masaru Higuchi, Suita-shi, Japan

[73] Assignee: West Electric Co., Ltd., Osaka, Japan

[22] Filed: Oct. 27, 1969

[21] Appl. No.: 869,722

[52] U.S. Cl............... 95/11 R, 95/11.5 R, 240/2 C
[51] Int. Cl. .......................................... G03b 15/05
[58] Field of Search......................... 95/1, 10 C, 11; 240/2 C

[56] References Cited
UNITED STATES PATENTS

| | | | |
|---|---|---|---|
| 2,566,349 | 9/1951 | Mager................................. | 313/358 |
| 2,856,562 | 10/1958 | Grimm............................. | 240/1.3 X |
| 2,858,632 | 11/1958 | Caserio et al........................ | 40/132 |
| 2,298,403 | 10/1942 | Mihalyi............................. | 240/2 X |
| 2,901,671 | 8/1959 | Most................................. | 95/11.5 X |
| 2,998,548 | 8/1961 | Girard............................. | 95/11.5 X |
| 3,116,671 | 1/1964 | Schankler.......................... | 95/11.5 |

Primary Examiner—Samuel S. Matthews
Assistant Examiner—Michael L. Gellner
Attorney—Stevens, Davis, Miller & Mosher

[57] ABSTRACT

An electronic flash for photography so constructed that an electroluminescent element is connected in the AC high voltage generating circuit of a DC—DC converter for the electronic flash device which charges a discharge capacitor adapted to flash a flashlight discharge tube and the electroluminescent element illuminates the exposure calculating dial of the electronic flash device or the camera on which the electronic flash device is mounted.

2 Claims, 4 Drawing Figures

PATENTED JUN 12 1973

3,738,239

M. HIGUCHI
INVENTOR

BY Stevens, Davis, Miller &
Mosher
ATTORNEYS

ELECTRONIC FLASH DEVICE FOR PHOTOGRAPHY

The present invention relates to an electronic flash device for photography which is provided with illuminating means for easy electronic flash photography at night and more particularly in the dark.

In the past, taking photographs in the dark required illuminating the instruments by means of a flashlight or the like because, without illumination, operations such as the reading of the scales of the range finder and iris diaphragm of a camera as well as the reading of exposure conditions for electronic flash photography were impossible.

The present invention contemplates improvements relating to the above inconvenience, whereby an electro-luminescence (hereinafter simply referred to as an "EL") element is disposed both in the exposure calculating board and the front portion of the electronic flash device for illumination with a portion of the output voltage of the DC-DC converter of the electronic flash device being utilized to supply power to these EL elements. Thus, there is no need to provide a separate power supply for the EL elements.

Since such an EL element is characterized by its extremely low power consumption, it is especially effective when incorporated in a small electronic flash device operated by a dry cell.

The present invention will be explained in conjunction with the accompanying drawings, in which.

Figure 1:
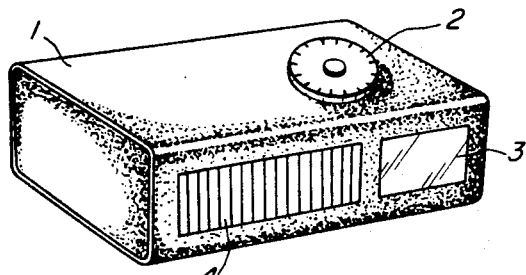
FIG. 1 is a perspective view showing an embodiment of the electronic flash device for photography according to the present invention.
Figure 2:
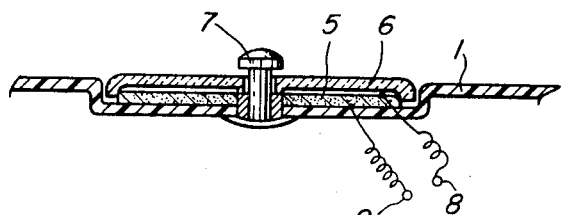
FIG. 2 is a partial sectional view showing an exposure calculating board incorporated in the electronic flash device of FIG. 1.

Referring particularly to FIG. 1, numeral 1 designates an electronic flash device proper; 2 an exposure calculating board provided with an EL element; and 3 a luminous plate similarly provided with an EL element. This EL panel 3 is adapted to illuminate, for example, the scale portions of a camera with which the electronic flash device proper is fitted. This illumination permits reading of the camera scales to perform the required operations. Numeral 4 indicates a flashlight-window through which flashing light of a suitable flashlight discharge tube contained within the electronic flash device 1 is emitted. Next, a construction incorporating the EL element of the present invention will be explained with reference to FIG. 2 showing the exposure calculating board 2 in which, by way of an example, numeral 1 designates a portion of the electronic flash device proper; 5 an annular EL panel; and 6 designates a rotating dial of a transparent plastic material having an exposure scale marked thereon, the dial being fitted to rotate about a pivot 7. Electrically, both terminals 8 and 9 of the annular EL panel 5 are brought out to be connected between the points A and B of a circuit shown in FIG. 3.

Such being the case, the application of voltage to the EL panel 5 causes it to produce light which in turn illuminates the rotating dial 6 of the exposure calculating board 6 of transparent plastic material to permit an extremely easy reading of the exposure scale even in the dark. In the case of the EL panel 3 being provided in the front portion of the electronic flash device proper 1 shown in FIG. 1, it may be connected between the points A and B of the circuit in the same manner as the said exposure calculating board 2.

Figure 3:
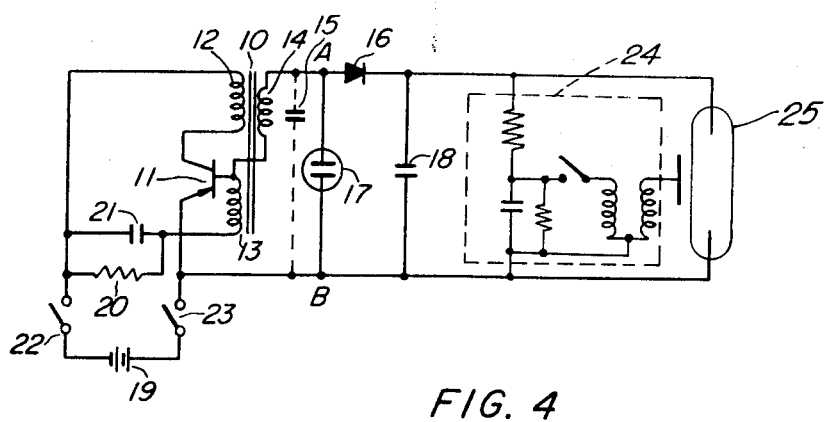
FIG. 3 is a circuit diagram for explaining the manner in which the power is taken out to supply the EL light source of the electronic flash device of FIG. 1.
Figure 4:
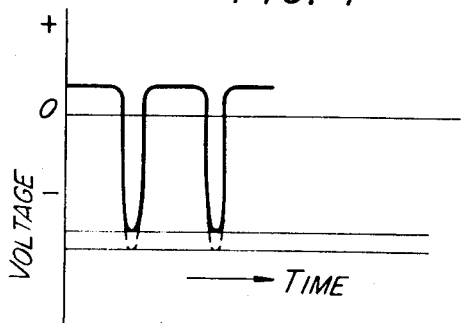
FIG. 4 is a diagram showing the waveform of the voltage supplied to the EL light source.

FIG. 3 shows a circuit consisting of an ordinary circuit for an electronic flash device with the said EL panel being inserted as designated at numeral 17. In this figure, numeral 10 designates an oscillating transformer consisting of a collector winding 12, a base winding 13 and a secondary high voltage output winding 14. If the values of the windings 12, 13 and 14 of the oscillating transformer and of a base resistor 20 and a bypass capacitor 21 are so chosen that a current from a battery 19 is transmitted at a frequency in the order of 5,000 cycles by means of a transistor 11, a voltage such as shown in FIG. 4 will be produced across the secondary high voltage output winding 14. A suitable flashlight discharge tube (not shown), for example, a xenon-filled discharge tube which emits a flash of light of high intensity, together with a conventional trigger circuit (not shown) associated with the flashlight discharge tube are connected in a known manner across the terminals of capacitor 18.

In addition, a diode 16 is connected to one end of the secondary high voltage output winding 14 and a flash capacitor 18 is connected to this diode. A circuit 24 shown in a dotted block is a well known trigger pulse circuit such as shown in Japanese patent publication No. 625/66 which is connected in parallel with the flash capacitor 18. Numeral 25 shows a suitable flashlight discharge tube which is also connected in parallel with the flash capacitor 18.

The circuit construction as described above is well known as a DC—DC converter for small sized electronic flash devices. In the figure, a capacitor 15 which is shown in the circuit by a dotted line functions to reduce the value of the voltage waveform appearing on the negative side in FIG. 4 and the use of this capacitor 15 is a common practice because, without it, the value of the voltage waveform increases as shown by a dotted line in FIG. 4 and the voltage exceeds 1,000 volts with a result that the breakdown voltage for the respective circuit components must be raised at the sacrifice of economy. However, if the EL panel 17 is inserted in the circuit in place of the capacitor 15 as in the case of the present invention, it is possible to dispense with the capacitor 15 because the EL panel 17 itself is a kind of capacitor by nature and thus it may perform the function of the capacitor 15 simultaneously.

Furthermore, since the EL panel produces light when the power supply switches 22 and 23 are closed to operate the electronic flash device, it is easily perceivable whether the switches are in the on position so that there will be no possibility of leaving the switches in their on position when the electronic flash device is not required for operation.

Still furthermore, since it is publicly known that according to the kinds of EL panel the intensity and color can be varied depending upon the terminal voltage and frequency, a higher intensity of illumination and hence a greater effectiveness are attainable with the present invention with employs a higher voltage and a high frequency as compared to a commercial voltage source. In addition, the lighting color may also be freely varied, for example, by adjusting the amount of copper, manganese, lead, etc. which is introduced into the zinc sulphide luminous materials as the activator thereof. Thus, being not only convenient for use but also superior from the aesthetic aspect, the device according to the present invention is highly useful and has a number of excellent features.

What is claimed is:

1. An electronic flash device for photography having a suitable flashlight discharge tube and means for flashing said discharge tube, comprising: a power supply; a D.C.—D.C. converter having an A.C. high voltage generating circuit portion, said converter being connected to said power supply; means connecting said discharge tube to said converter; a transparent plastic material on which an exposure calculating dial is graduated; and an electroluminescence means disposed adjacent said transparent material and connected to said converter in said A.C. high voltage generating circuit portion wherein, when said D.C.—D.C. converter is in an operative state, said electroluminescence means constitutes a continuous source of illumination of the area adjacent said electroluminescence means to illuminate said dial.

2. An electronic flash device for photograph according to claim 1, wherein said electro-luminescence means is connected across the terminals of said A.C. high voltage generating circuit.

* * * * *